3,735,005
METHOD FOR PREPARING A VIABLE PLATELET CONCENTRATE
Hideo Shio, Palo Alto, and Peter W. Ramwell, Portola Valley, Calif., assignors to Alza Corporation, Palo Alto, Calif.
No Drawing. Filed Aug. 19, 1970, Ser. No. 65,317
Int. Cl. A61k 17/00; C12k 9/00
U.S. Cl. 424—101        7 Claims

ABSTRACT OF THE DISCLOSURE

A method for the preparation of a viable platelet concentrate while simultaneously preserving the platelet's function and integrity by adding to plasma-containing platelets, a platelet-preserving prostaglandin and separating the platelets from the plasma to give a viable platelet concentrate. The preserving prostaglandin is used alone or in intimate combination with other platelet preserving agents.

BACKGROUND OF THE INVENTION

This invention relates to both novel methods for the preparation of platelets and to novel compositions of matter pharmaceutically acceptable for the preparation of platelets. More particularly, the present invention pertains to methods for the preparation of platelet concentrates while simultaneously inhibiting platelet aggregation and to compositions of matter comprising at least one platelet anti-aggregation agent suitable for preparing platelet concentrates possessing value as therapeutic agents. Specifically, the subject invention concerns a method for preparing a non-aggregated platelet-rich concentrate by employing at least one aggregation inhibiting prostaglandin used alone or in combination with other aggregation inhibiting agents.

Platelet transfusions are an important modality for mammals with hemostatic and coagulation defects, for maintaining vascular integrity, and for administering to mammals receiving intensive chemotherapy. With this latter status, mammals receiving intensive chemotherapy, it is generally art known that many widely used chemotherapeutic agents when administered in sufficient dose frequently may lead to depressed platelet production or to an increased platelet destruction. The chemotherapeutic agents that usually depress platelet production generally do so by producing bone marrow suppression. These agents are most often indicated for the management of neoplastic disorder, leukemia, leukemic-like conditions and the agents include ionizing radiation; alkylating agents such as nitrogen mustard, triethylene melamine, busulfan; ethyl carbamate; antimetabolites such as antipurines and antifolics and other agents such as benzene derivatives, chloramphenical and the like. Other chemotherapeutic agents well known to the art frequently associated with platelet destruction often include quinine, arsphenamine, sulfamethoxypyridazine, gold salts, phenylbutazone derivatives and the like.

In the conditions set forth immediately above, platelet therapy is usually indicated as one of the prescribed therapeutics. Also, in the prior art, there are reports that platelet therapy has permitted mammals with severe aplastic anemia to survive, undergo surgery and sometimes recover from the just stated condition. Thus, in view of the obvious importance of platelet therapy in the light of the prior art, it becomes immediately apparent that a critical need exists for viable platelets suitable for their predetermined purpose. However, serious problems are often encountered during the preparation of viable platelet-rich plasma and viable platelet-rich concentrates from fresh whole blood. The chief and most serious problem encountered during the preparation and the isolation of the desirable platelets is platelet clumping or platelet aggregation. Platelet aggregation is usually caused by swelling resulting either from storage, from induced chemical stimulation or from varying degrees of vibrations and agitations that occur in the preparation of platelets from normal whole blood. Various attempts have been made by the art to overcome the clumping of the platelets by adding anti-clumping agents such as monoiodacetate, p-chloromercuribenzoate, methylmercuric nitrate and the like to the whole blood before the platelets were separated therefrom; but, these reagents possess the serious inherent disadvantage that in the concentration employed a large amount of the reagent is transported with the platelets to the mammal and inducing thereby an unwanted and unneeded chemical, often possessing harsh side effects into the mammal. Other attempts have involved the desire to eliminate the processing vibrations and agitations produced by the scientific equipment during the separation of the platelets from the whole blood but the need for the equipment and their operating conditions has prevented any real success for this attempt. A more recent suggestion involved the addition of prostaglandins to whole blood to seemingly preserve platelets as later separated from the whole blood; however, this has not proved successful as the anti-aggregation properties of the prostaglandin were significantly diminished or made apparently inoperative by apparent damage to the cell or by the other conditions used in processing the whole blood. Thus, in view of this presentation, it becomes immediately apparent that a critical need exists for a method and composition for preparing non-aggregated platelets and that if said method and composition were made available to the art it would represent both a valuable contribution and an advancement to the art.

Accordingly, it becomes an immediate object of the present invention to provide methods and compositions for preparing platelets that are not subject to the difficulties associated with the prior art.

Yet still another object of the invention is to provide a method for preparing platelet-rich plasma and platelet-rich concentrates that are essentially-free of platelet aggregation.

Still yet another object of the invention is to provide novel compositions of matter containing at least one prostaglandin possessing anti-aggregation characteristics for the preparation of platelet-rich plasma and platelet concentrates.

Another object of the invention is to maintain the chemical anti-aggregation material under conditions that protect the chemical from any adverse atmospheric effects, mainly attributed to oxygen.

Yet still another purpose of the invention is to keep the anti-aggregation material, for example, prostaglandin, under separate conditions until its immediate use, to protect the material from the degradation by acidic or basic conditions and the like.

These objects as well as other objects, features and advantages of this invention will become more readily apparent to those skilled in the art from the following detailed description and accompanying claims.

SUMMARY OF THE INVENTION

The invention concerns a method for collecting platelets from whole blood while simultaneously essentially inhibiting any aggregation of the platelets by the steps of separating the plasma from the blood, adding a platelet anti-aggregation prostaglandin to the plasma, either alone or in combination with one or more other physiologically acceptable anti-aggregation agents, and finally, separating the platelets from the plasma to produce a viable, non-clumped platelet concentrate. This invention employs the platelet anti-aggregation inhibiting prostaglandins and other acceptable anti-aggregation inhibiting agents by adding these agents to the plasma to shield the agents from the harmful effects produced by the low acidic conditions associated with most widely used anti-coagulants, and the invention also adds the agents to the plasma separated from whole blood and other reagents to further protect the agents from adverse chemical reagents, processing or atmospheric conditions. The invention also concerns compositions of matter containing anti-aggregation agents and other anti-aggregation agents.

DESCRIPTION OF THE INVENTION

In attaining the objects, features and advantages of the present invention, it has now been surprisingly found that by using the unobvious methods of the invention for the preparation of platelets, non-aggregated platelet-rich plasma and non-aggregated platelet concentrates can be inventively prepared by employing an anti-aggregation prostaglandin alone, or joined in composition with other anti-aggregation prostaglandins or anti-aggregation platelet agents.

The prostaglandins acting as anti-aggregation or anti-clumping agents, and when used herein the terms aggregation and clumping are to be construed as equivalent, suitable for the purpose of the present invention are the naturally occurring and synthesized prostaglandin compounds possessing anti-aggregation properties. Such compounds generally have a carbon skeleton that is a derivative of prostanoic acid; chemically, the prostaglandins are usually considered as unsaturated $C_{20}$ fatty acids with five of the carbon atoms forming a cyclopentane ring, that is, the cyclopentane ring can be viewed as a nucleus to which two side chains are attached in the vicinal position. The hypothetical completely saturated and unsubstituted parent compound of the natural and synthesized prostaglandins, prostanoic acid is represented by the formula, as illustrated in Figure 1.

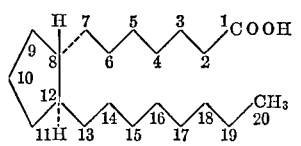

(Figure 1)

The nomenclature of the naturally occurring prostaglandins their positional isomers and homologues and their synthetic analogues is derived from the above formula and numbering system. In the formula, a dotted line represents a valency bond in the $\alpha$-configuration, a solid line a valency bond in the $\beta$-configuration, and a wavy bond when used indicates either $\alpha$ or $\beta$. For further classification, there are four types of prostaglandis known as E, F, A and B, respectively. The E-type prostaglandins (Figure 2 and its diastereomers), have an 11-hydroxy and a 9-keto group in the five-membered ring.

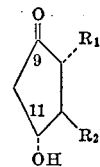

(Figure 2)

In the F-type prostaglandins, Figure 3, the 9-keto group is reduced to a hydroxyl group.

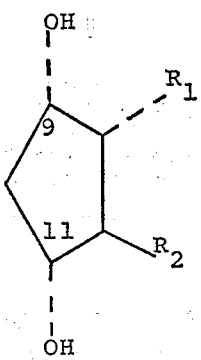

(Figure 3)

The F-type prostaglandins, also include the diastereomers of the depicted structure. The nucleus of A-type prostaglandins (Figure 4 and its diastereomers), retains the 9-keto group but has a double bond at the 10:11 position of the nucleus, thusly.

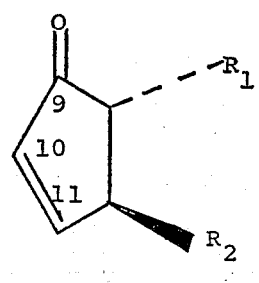

(Figure 4)

The nucleus of the B-type prostaglandins (see Figure 5), retains the characteristic 9-keto group with the further identifying feature of a 8:12 double bond, thus.

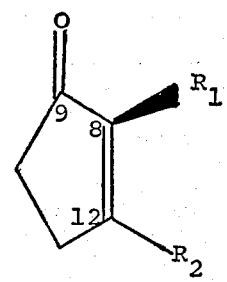

(Figure 5)

Among the naturally occurring prostaglandin compounds, two side chains $R_1$ and $R_2$ have been described in the literature. One side chain contains a terminal carboxylic acid group and may also contain a cis-double bond, while the other side chain contains a hydroxyl functional group together with one or more double bonds. These side chains are present in the prostaglandins in three combinations designated 1, 2 and 3, respectively, depending upon the total number of double bonds present, so that the natural prostaglandins are designated as $E_1$, $E_2$, $E_3$, $F_1$, $F_2$, etc. All primary prostaglandins contain a 13:14 trans double bond. The $E_1$ and $F_1$ compounds contain only this one double bond; while the $E_2$ and $F_2$ molecules have an additional 5:6 cis-double bond. The following box further elucidates the chemical structure of the prostaglandin side chains.

| Prostaglandins | | | | $R_1$ | $R_2$ |
|---|---|---|---|---|---|
| $E_1$ | $F_1$ | $A_1$ | $B_1$ | —$(CH_2)_6$—COOH | —CH:CHCH(OH)$(CH_2)_4CH_3$ |
| $E_2$ | $F_2$ | $A_2$ | $B_2$ | —$CH_2CH:CH(CH_2)_3$COOH | —CH:CHCH(OH)$(CH_2)_4CH_3$ |
| $E_3$ | $F_3$ | $A_3$ | $B_3$ | —$CH_2CH:CH(CH_2)_3$COOH | —CH:CHCH(OH)$CH_2CH:CHCH_2CH_3$ |

The prostaglandins based upon the above described chemical structure that are operable according to the mode and manner of the present invention are the physiologically acceptable anti-aggregation E-type prostaglandins and the E-type prostaglandin-like compounds that can be represented by the following formula designated as Figure 6 and diastereomers thereof represented by formulas illustrated in Figures 7 and 8, and

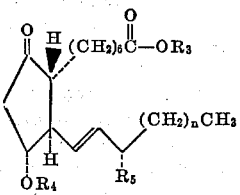

(Figure 6)

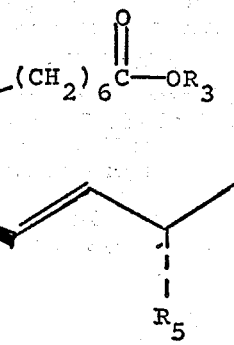

(Figure 7)

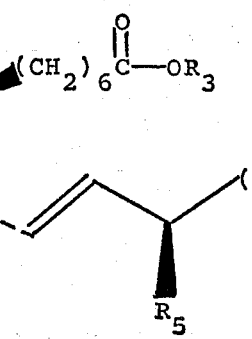

(Figure 8)

wherein in formulas of Figures 6, 7 and 8, $R_3$ is hydrogen or lower alkyl group, $R_4$ is a member selected from the group consisting of hydrogen, lower alkyl and the acyl group of a hydrocarbon carboxylic acid of 2 to 18 carbon atoms; $R_5$ is a hydroxyl group, $n$ is a positive whole integer of 3 to 5 inclusive, and $OR_4$ and $R_5$ may have an $\alpha$ or $\beta$ configuration, the broken line indicating $\alpha$, the solid line $\beta$, and a wavy line either an $\alpha$ or $\beta$ orientation. Exemplary of lower alkyl containing from 1 to 8 carbon atoms suitable for the present purpose, are the branched or straight chain hydrocarbon groups such as methyl, ethyl, propyl, isopropyl, butyl, tert-butyl, pentyl, hexyl and the like. Representative of acyl are acetyl, propionyl, butyryl, hexanoyl, octanoyl, lauroyl, palmitoyl, stearoyl, oleoyl, and the like. The non-toxic pharmaceutically acceptable salts that can also be used include those of the non-toxic alkali metal and alkaline earth metal bases such as sodium, potassium, calcium, lithium and copper, and magnesium hydroxides and carbonates, and the ammonium salts and substituted ammonium salts, for example, non-toxic salts of trialkylamines such as triethylamine, trimethylamine, triisopropylamine, procaine, epinephrine, dibenzylamine, triethanolamine, N-benzyl-beta-phenethylamine, ethyldimethylamine, benzylamine, N-(lower) alkylpiperidine, N-ethylpiperidine, 2-methylpiperidine, and other acceptable amines. The presently preferred structure for anti-aggregation effects as set forth above is of the prostaglandin E-type configuration. The aggregation inhibiting property for the prostaglandins is often attributed to the presence of the C=O group of the carboxyl group or the C=O of the esterified carboxyl group, the presence of the hydroxyl group at the C–15 position and the keto group at the C–9 position of the cyclopentane nucleus.

The prostaglandins may be used according to the spirit of the invention alone, or in combination with one or more prostaglandins or in mixtures comprising prostaglandins and other known physiologically acceptable platelet anti-aggregation agents. For example, the prostaglandin of Figure 9

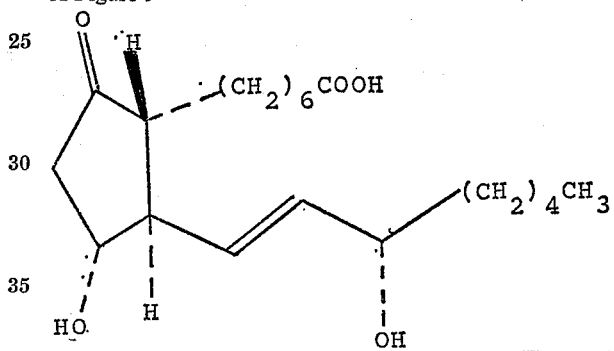

(Figure 9)

can be used alone or in combination with the prostaglandin of Figure 10

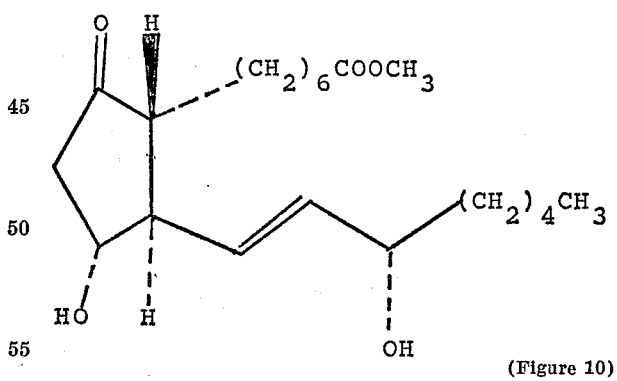

(Figure 10)

or with the prostaglandin of Figure 11

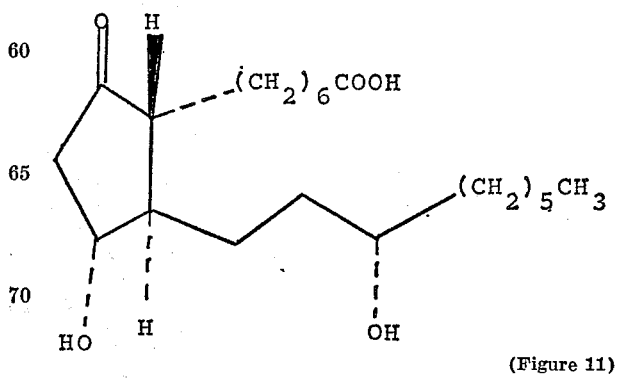

(Figure 11)

or with mixtures thereof as set forth in the above formulae. The prostaglandins can also be intimately admixed with other therapeutically acceptable anti-aggregation agents into a homogeneous composition of matter for the purpose of this invention. Other compounds that inhibit platelet aggregation are acetylsalicylic acid, methyl benzoyl ecgonine, cetyl-pyridinium bromide, toluidine blue, purine riboside, 2-oxy-6-amino purine riboside, agmatine, cysteine and the like. The prostalglandins and the compositions formulated containing prostaglandins and other anti-aggregation agents can also be employed by mixing them with therapeutically acceptable carriers like isotonic saline, sterile water and the like. The amount of prostaglandin used will of course depend upon the amount of plasma being processed and if the prostaglandin is used alone or in combination with other agents. Generally, about 50 nanograms (0.05 microgram) to about 1000 nanograms (1 microgram) of prostaglandin will be used for each 1 milliliter platelet-rich plasma. The usual amount used is about 100 nanograms (0.1 microgram) for 1 ml. of plasma. When the prostaglandin is used in combination with other anti-aggregation agents, about 50 nanograms to 5000 nanograms (5 micrograms) of the latter for each milliliter of plasma are also employed for the purpose of the invention. Thus, for a 200 to 250 ml. sample of plasma, about 10 to 50 micrograms of prostaglandins, its esters, diastereomers and the like, alone or in combination with each other will be used, and when used with non-prostaglandins about 1 to 100 micrograms thereof may be used in the combination.

The following examples will further serve to illustrate the invention and these examples are not to be construed as limiting the invention as other embodiments will be apparent to those versed in the art for the present disclosure.

EXAMPLE 1

Preparation of platelet-rich plasma: First, about 430 ml. of fresh whole blood is collected into a container containing about 70 ml. of ACD (acid-citrate-dextrose) solution (U.S.P., formula A), and the container is centrifuged at 375×g for about 15 minutes at 20° C. After completion of the centrifuge period, the upper plasma portion containing the platelets is separated from the lower blood portion and it is transferred to a second chemically inert container that does not contain any acid-citrate-dextrose solution. About 220 ml. of platelet-rich plasma is transferred from the first container to the second container that is not open to the atmosphere and has about 20 micrograms of 11α,15α-dihydroxy - 9 - oxo-13 - trans - prostenoic acid therein for the purpose of preserving and maintaining the functionality of the platelets in the plasma. This latter container may be stored or its contents may be immediately used for its intended purpose. When used, the plasma container is centrifuged at 1,500×g, for 15 minutes and at 20° C. to produce a separation of the plasma from the platelets. Most of the upper plasma portion that separated from the platelets is decanted from the container and the viable, non-aggregated platelet concentrate may now be used for its intended purpose.

EXAMPLE 2

The procedure set forth in Example 1 is followed in this Example 2, and all the processing steps are as described for Example 1 except that the anti-aggregation agent 11α,15α-dihydroxy - 9 - oxo-prost-13-trans-prostenoic acid is added to the plasma from a separate air-tight plastic container after the platelet-rich plasma is separated into the second container. This procedure has the advantages that the anti-aggregation agent housed in a separate container or bag until its immediate use is protected from any adverse, unwanted effects such as degradation by the atmosphere, or long term exposure to curing peroxides normally present in plastic bags and the like. Also, by adding the anti-aggregation agent to the plasma, and by not mixing it with acidic anti-coagulants, it is protected from deteriorating effects produced by the acidic pH of the anti-coagulant if present in the second container. The anti-coagulant ACD has a pH of about 5 and, by keeping the anti-aggregation separate from the ACD and by adding it to the plasma it is possible to keep the prostaglandin anti-aggregation agent at a pH of 6.5 to 7.0.

EXAMPLE 3

The procedure set forth in Example 1 and Example 2 is followed in the present example and all the procedures and reagents are as described above, except that the plasma-collecting container is divided into two compartments, a small compartment containing the anti-aggregation agent housed within the larger plasma-collecting compartment. Thus, after the platelet-rich plasma is transferred to the large compartment, the small compartment is manually ruptured and the anti-aggregation agent is permitted to escape therefrom and come into immediate contact with the plasma. This dual compartment plasma container un-obviously offers to the art a novel means for protecting the anti-aggregation agent from adverse atmospheric conditions while simultaneously keeping the agent in close proximity to the plasma for its immediate use.

EXAMPLE 4

430 ml. of fresh whole blood is collected into a container containing 70 ml. of ACD anti-coagulant and the container is centrifuged at 375×g for 15 minutes at 20° C. Next, the plasma is separated from the blood and it is transferred to a container having about 20 micrograms of methyl-11α,15α-dihydroxy-9-oxo - 13 - trans-prostenoate and 1 microgram of acetylsalicylic acid. The presence of the two anti-aggregation agents essentially inhibits any swelling or clumping of the platelets. Next, the plasma is centrifuged and the plasma-rich concentrate, about 25 ml. in volume is separate from the plasma.

EXAMPLE 5

In this run, blood is collected in a triple-pack with 70 ml. of ACD in the first pack. The blood pack is centrifuged at 375 g for 15 minutes, and about 200 ml. of plasma is removed from the first pack. Next, 10,000 nanograms (10 micrograms) of methyl 11α,15α-dihydroxy-9-oxo-13-trans-prostenoate, 10,000 nanograms (10 micrograms) of 11α,15α-dihydroxy-9-oxo-13-trans-prostenoic acid and 1,000 nanograms (1 microgram) of cocaine is mixed with the plasma, either by transferring the three anti-aggregation agents in a homogeneous composition from an essentially air-tight container to the plasma collecting pack or by manually rupturing a non-reactive plastic container located with the plasma pack and housing the three anti-aggregation agents to bring the anti-aggregation agents into immediate contact with the plasma. Next, the plasma-rich platelet is centrifuged at about 1,500 g for 15 minutes to concentrate the platelets and the supernatant plasma is transferred to the third pack. About 20 to 25 ml. of platelet concentrate is left in the second plasma pack.

EXAMPLE 6

A non-acidified platelet concentrate is prepared by collecting donor blood in the blood-collecting compartment or bag of a commercially available three-compartment blood-collecting system. The three compartments are separate, but they are connected to each other by polymeric conduits. The first compartment, or blood-collecting bag contains about 70 ml. of ACD anti-coagulant for about one-half liter of whole blood. After the blood is collected, the bag is centrifuged and the plasma transferred through the polymer conduit to a second compartment that does not contain any acid anti-coagulant. To this second acid-free compartment is added 20 micrograms of 11α,15α-dihydroxy-9-oxo-13 - trans - prostenoic acid from an independent container or plastic bag through a polymer tube connected to the second compartment.

The prostenoic acid is added to protect the platelets from any possible destruction, such as aggregation. Then, the second bag is centrifuged and the plasma transferred through a polymer tube to the third bag to produce in the second bag an essentially non-acidified platelet concentrate.

Having thus described the invention and various embodiments thereof, it is to be understood that the disclosure is not to be construed as limiting, as these embodiments and other variations will be obvious to those versed in the art from reading the present specification and appended claims.

What is claimed is:

1. In a method for the preparation of a viable platelet concentrate wherein the method comprises the steps of first separating plasma from whole blood and then separating platelets from plasma, the improvement which comprises adding to the plasma in an essentially chemically inert container substantially closed to the atmosphere after separating the plasma from the whole blood and prior to separating the platelets from the plasma an amount of a prostaglandin selected from a compound of the formulas:

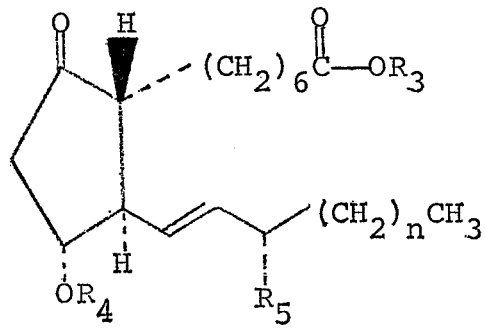

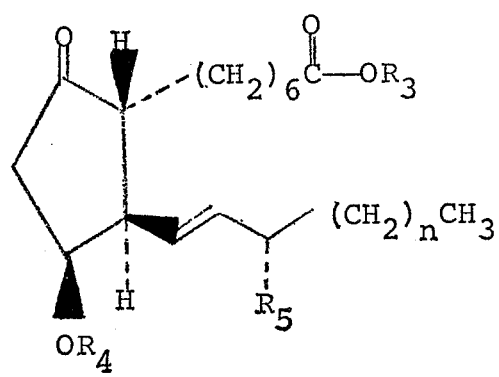

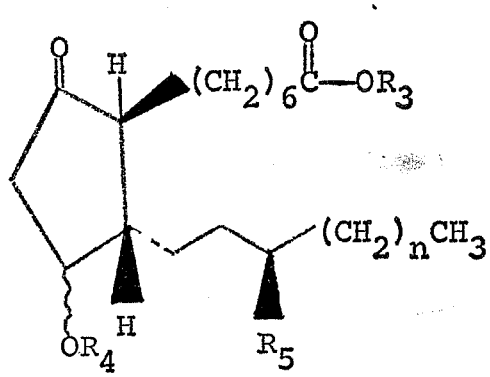

wherein $R_3$ is a member selected from the group consisting of hydrogen and lower alkyl, $R_4$ is a member selected from the group consisting of hydrogen, lower alkyl and an alkanoyl group of 2 to 18 carbons, $R_5$ is a hydroxyl group, $n$ is a positive whole integer of 3 to 5 inclusive, sufficient to prevent aggregation of the platelets and thereby to produce the desired platelet viable concentrate.

2. A method for the preparation of a viable platelet concentrate according to claim 1 wherein the protecting prostaglandin is added to the plasma in combination with at least one additional platelet protecting agent selected from the group consisting of acetylsalicylic acid, methyl benzoyl ecgonine, cetylpyridinium bromide, toluidine blue, purine riboside, 2-oxy-6-amino purine riboside, agmatine and cysteine.

3. A method for the preparation of a viable platelet concentrate according to claim 1 wherein a mixture of the platelet protecting prostaglandins is employed.

4. A method for the preparation of a viable platelet concentrate according to claim 1 wherein the platelet protecting prostaglandin is added in the form of its therapeutically acceptable salt.

5. A method for the preparation of a viable platelet-rich concentrate according to claim 1 wherein the method consists essentially of mixing with non-acidified plasma rich with platelets a platelet-protecting prostaglandin, and then separating the protected platelets from said plasma to produce a platelet concentrate.

6. A method for the preparation of a viable platelet-rich concentrate according to claim 5 wherein the prostaglandin is added to the plasma in combination with a second platelet protecting prostaglandin selected from the group consisting of acetylsalicylic acid, methyl benzoyl ecgonine, cetylpyridinium bromide, toluidine blue, purine riboside, 2-oxy-6-aminopurine riboside, agmatine and cysteine.

7. A method for the preparation of a viable platelet concentrate according to claim 1 wherein the improvement comprises adding the prostaglandin to the plasma in an essentially chemically inert container substantially closed to the atmosphere and essentially free of acid citrate dextrose anti-coagulant to produce the desired platelet viable concentrate.

References Cited

UNITED STATES PATENTS 3,475,429  10/1969  Woitun et al. _____ 424—251

OTHER REFERENCES

Pickles: Biological Reviews, vol. 42 (1967), pp. 635 and 636.

SAM ROSEN, Primary Examiner

U.S. Cl. X.R.

195—1.8